Figures 1, 2:
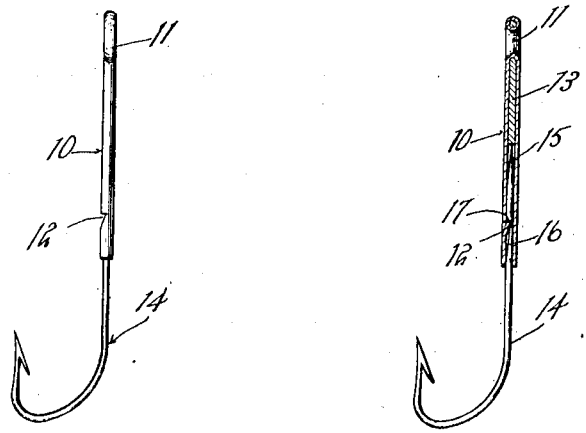

C. L. VAN NORSDALL.
FISH HOOK.
APPLICATION FILED JULY 23, 1910.

1,055,104. Patented Mar. 4, 1913.

Witnesses
J. C. Simpson
Henry T. Bright

Inventor
C. L. Van Norsdall
By
Chandler & Chandler
Attorneys

UNITED STATES PATENT OFFICE.

CALVIN L. VAN NORSDALL, OF WEIR, KANSAS.

FISH-HOOK.

1,055,104.　　　　Specification of Letters Patent.　　Patented Mar. 4, 1913.

Application filed July 23, 1910. Serial No. 573,492.

*To all whom it may concern:*

Be it known that I, CALVIN L. VAN NORSDALL, a citizen of the United States, residing at Weir, in the county of Cherokee, State of Kansas, have invented certain new and useful Improvements in Fish-Hooks; and I do hereby declare the following to be a full, clear, and exact description of the invention, such as will enable others skilled in the art to which it appertains to make and use the same.

This invention relates to fish hooks.

The object of the invention is to provide a fish hook adapted to be easily disconnected from a line without injury to either hook or line and also adapted to be quickly and easily withdrawn in the direction of its barbed point from a fish caught thereon, thereby avoiding mutilation of the fish or the subjection of same to undue torture.

A further object of the invention is to provide a fish hook comprising detachably connected shank and hook members, the latter of which has a pointed upper end whereby live bait may be placed on the hook at said end without injury to the bait, as is likely when the same in placed on a hook at the barbed forward end thereof.

With the above and other objects in view the invention consists in the details of construction and combination and arrangement of parts as will be hereinafter more fully described and particularly pointed out in the appended claim.

In describing the invention in detail reference will be had to the accompanying drawings wherein like characters of reference denote corresponding parts in the several views, and in which:

Figure 1 is a side elevation of a fish hook constructed in accordance with the invention; and, Fig. 2, a vertical longitudinal section of same with the hook member shown in elevation.

Referring to the drawings, 10 indicates the tubular shank member of the hook, the upper end of which terminates in an eye 11 for the attachment of a line. Struck up from the tubular shank member 10, near its lower end is an inwardly projecting finger 12 for a purpose that will presently appear. The member 10 is further provided with a solid core which extends through the eye 11 but terminates short of the finger 12.

A hook member 14 has its upper end pointed as at 15 and is further provided inward of the pointed end 15 with a cutaway portion 16 forming a shoulder 17. In assembling the members of the hook the pointed end 15 of the hook member is inserted in the lower end of the shank member 10 until the shoulder 11 is moved beyond the finger 12 when the latter will spring inwardly as a result of its resiliency and engage the shoulder 17 and thus prevent the withdrawal of the hook member from the shank member. Further inward movement of the hook member is prevented by the engagement of the pointed end 15 with the core 13. In order to separate the members of the hook it is only necessary to rotate the hook member until the shoulder 17 is moved out of engagement with the finger 12 when said members may be easily drawn apart.

What is claimed is:

A fish hook comprising a cylindrical tubular shank member provided with line attaching means, an inwardly projecting stem rotatably mounted in said shank member, a hook member having a cylindrical stem rotatably mounted in sai dshank member, said stem being provided with a cutaway portion forming a shoulder and a flat face engaged by the free end of the spring tongue whereby the hook member is yieldingly held against rotation and secured against longitudinal movement in the tubular member, said stem being adapted upon rotation to force the free end of the tongue outwardly of the shank member and move the shoulder and flat face out of engagement with the tongue whereby the hook member is rendered free to be withdrawn from the shank member by a longitudinal movement of the hook member relatively to the shank member.

In testimony whereof, I affix my signature, in presence of two witnesses.

CALVIN L. VAN NORSDALL.

Witnesses:
　B. W. CROWE,
　R. C. GIBBY.